US 6,851,646 B2
(12) United States Patent
Jones

(10) Patent No.: US 6,851,646 B2
(45) Date of Patent: Feb. 8, 2005

(54) METHOD AND APPARATUS FOR ACTUATING MOVABLE COMPONENTS, INCLUDING CANARDS, OVER MULTIPLE RANGES

(75) Inventor: Kelly T. Jones, Snohomish, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/690,283

(22) Filed: Oct. 20, 2003

(65) Prior Publication Data

US 2004/0099765 A1 May 27, 2004

Related U.S. Application Data

(60) Provisional application No. 60/420,668, filed on Oct. 22, 2002, provisional application No. 60/420,196, filed on Oct. 21, 2002, provisional application No. 60/420,670, filed on Oct. 22, 2002, and provisional application No. 60/420,621, filed on Oct. 22, 2002.

(51) Int. Cl.$^7$ ............................................. B64C 13/28
(52) U.S. Cl. ..................................... 244/45 A; 244/131
(58) Field of Search ........................... 244/7 R, 6, 48, 244/87, 45 A, 5 C, 6 C, 45 R, 75 R, 216, 88, 129.4, 129.5, 102 R; 116/37, 169, 152; 384/549, 459, 618, 565, 570, 572

(56) References Cited

U.S. PATENT DOCUMENTS

| | | | |
|---|---|---|---|
| 384,023 A | | 6/1888 | Corbett |
| 458,317 A | | 8/1891 | Hawyer |
| 700,201 A | | 5/1902 | Howe |
| 2,029,717 A | | 2/1936 | Howe et al. |
| 2,189,615 A | | 2/1940 | Rampacher et al. |
| 2,421,694 A | | 6/1947 | Hawkins |
| 2,788,182 A | * | 4/1957 | Tobin et al. ................... 244/48 |
| 4,281,810 A | * | 8/1981 | Poisson-Quinton et al. ........................ 244/75 R |
| 4,433,878 A | | 2/1984 | Rosenthal |
| 4,796,840 A | * | 1/1989 | Heynatz ...................... 244/215 |
| 5,092,539 A | * | 3/1992 | Caero ....................... 244/75 R |
| 5,150,858 A | | 9/1992 | Hopwell |
| 5,495,999 A | * | 3/1996 | Cymara .................... 244/45 A |
| 5,887,986 A | | 3/1999 | Pouliquen |
| 6,064,923 A | | 5/2000 | Bilange et al. |
| 6,247,667 B1 | * | 6/2001 | Fenny et al. ................. 244/7 R |
| 6,382,556 B1 | * | 5/2002 | Pham ............................ 244/6 |
| 6,695,688 B1 | | 2/2004 | Owen et al. |
| 6,698,688 B1 | | 3/2004 | Jones |

OTHER PUBLICATIONS

Dryden Flight Research Center EC98 44749–24, Photographed Sep. 1998 (1 page) http://www.dfrc.nasa.gov/Gallery/Photo/TU–144LL/Small/EC98–44749–24.jpg [Accessed Oct. 7, 2003].

Dryden Flight Research Center ED96 43549–2, Photographed Mar. 17, 1996 (1 page) http://www.dfrc.nasa/gov/Gallery/Photo/TU–144LL/Small/EC96–43549–2.jpg [Accessed Oct. 7, 2003].

(List continued on next page.)

Primary Examiner—Galen Barefoot
(74) Attorney, Agent, or Firm—Perkins Coie LLP

(57) ABSTRACT

Methods and apparatuses for installing and actuating movable components, including canards, over multiple ranges. An apparatus in accordance with one embodiment of the invention includes a canard coupled to multiple actuators, one of which moves the canard over a first range of motion and the other of which moves the canard over a second, extended range of motion. A lockout device can prevent actuation over the second range of motion except when selected conditions are met.

30 Claims, 4 Drawing Sheets

OTHER PUBLICATIONS

Super70s.com, "Konkordski": The Tu–144, Copyright 2002 (4 pages) http://www.super70s.com/Super70s/Science/Transportation/Aviation/TU–144.asp [Accessed Oct. 7, 2003].

North American History, "XB–70A First Flight: 1964," (3 pages) http://www.boeing.com/history/bna/xb70.html [Accessed Sep. 18, 2003].

Niu, Michael C.Y., "Airframe Structural Design, Practical Design Information and Data on Aircraft Structures," Chapter 10 (pp. 358–369), Copyright 1988 Conmilit Press, Ltd., Hong Kong.

Roskam, Dr. Jan, "Airplane Design, Part II: Preliminary Configuration Design and Integration of the Propulsion System," ( 5 pages), Copyright Roskam Aviation and Engineering Corporation, Ottawa, Kansas, First Printing: 1985.

Timken, Bearings, Comparing Other Bearing Types (19 pages), Copyright 2002 http://www.timken.com/products/bearings/fundament/compare.asp [Accessed Jun. 26, 2002].

Rockwell International, B–1, AF–1 Test Specimen (1 page).

Flight, F–15, Reed Business Publishing Group, David Hatchard, Sutton 1991 (1 page).

F–15 Diagram (2 pages).

F–18, Fuselage Section—Assembly of Aft Structure (1 page).

F–18, The Boeing Company, Figure 3, Test Fixture (1 page).

F–18, The Boeing Company, Figure 2, Stabilator FT69 Test Article (Ref. E/F End Item Dwg 74T062133) (1 page).

F–18 Diagram (3 pages).

* cited by examiner

METHOD AND APPARATUS FOR ACTUATING MOVABLE COMPONENTS, INCLUDING CANARDS, OVER MULTIPLE RANGES

CROSS-REFERENCE TO RELATED APPLICATIONS

This application claims priority to the following U.S. provisional applications, all of which are incorporated herein by reference: 60/420,668 filed Oct. 22, 2002; 60/420,196 filed Oct. 21, 2002; 60/420,670 filed Oct. 22, 2002; and 60/420,621 filed Oct. 22, 2002.

TECHNICAL FIELD

The present disclosure is directed generally to methods and apparatuses for actuating movable components, including canards, over multiple ranges.

BACKGROUND

Most existing commercial passenger transport aircraft include a pressurized fuselage, a wing positioned toward the middle of the fuselage, and a tail positioned aft of the wing. The tail typically includes (horizontal) pitch and (vertical) yaw stability and control surfaces, and is mounted to an unpressurized empennage attached to the aft portion of the fuselage. In some arrangements, the entire horizontal portion of the tail moves as a unit relative to the fuselage. In other arrangements, the tail includes a fixed horizontal stabilizer and a movable elevator. In yet another arrangement, the tail includes a slow moving horizontal stabilizer and a fast moving elevator. In any arrangement, the structure required to support the tail surfaces and the actuators required to move the tail surfaces can be located in the unpressurized empennage of the aircraft without impacting the volume of the passenger cabin in the pressurized fuselage.

One drawback with the foregoing arrangement is that it may not be suitable for commercial passenger aircraft having pitch axis stability and control surfaces (such as canards) axially aligned with the pressurized fuselage. For example, integrating the support structure and actuator equipment required for these stability and control surfaces can have a substantial adverse impact on the volume of the passenger cabin.

SUMMARY

The present invention is directed to methods and apparatuses for actuating movable components, including canards, over multiple ranges. An aircraft in accordance with one aspect of the invention includes a fuselage portion, a wing portion coupled to the fuselage portion, and a movable device having a first range of motion and a second range of motion different than the first range of motion. A first actuator can be coupled to the movable device and can be positioned to move the movable device over the first range of motion. A second actuator can be coupled to the movable device and can be positioned to move the movable device over the second range of motion. A control device can be coupled to at least one of the first and second actuators and can be configured to control actuation of the least one of the first and second actuators.

In a particular aspect of the invention, the movable device can include a canard. In another aspect of the invention, an apparatus (e.g., other than an aircraft) can include a movable device, a first actuator, a second actuator, and a control device having characteristics generally similar to those identified above. In yet a further aspect of these embodiments, the first actuator can have a first load capacity and the second actuator can have a second load capacity less than the first load capacity. The first actuator can be positioned to move the movable device over a first angular range of motion, and the second actuator can be positioned to move the movable device over a second angular range of motion, with at least a portion of the second angular range of motion extending beyond the first angular range of motion.

DETAILED DESCRIPTION

The present disclosure describes methods and apparatuses for actuating movable components, including canards, over multiple ranges. Many specific details of certain embodiments of the invention are set forth in the following description and in FIGS. 1–7 to provide a thorough understanding of these embodiments. One skilled in the art, however, will understand that the present invention may have additional embodiments, and that the invention may be practiced without several of the details described below.

Figure 1:
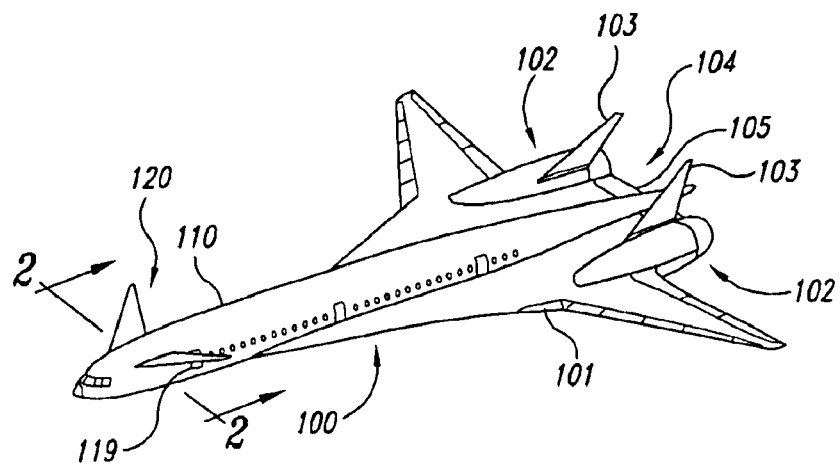
FIG. 1 is a partially schematic, isometric view of an aircraft having a canard assembly in accordance with an embodiment of the invention.

FIG. 1 is a partially schematic, isometric illustration of an aircraft 100 having a canard assembly 120 in accordance with an embodiment of the invention. The canard assembly 120 is attached to a fuselage 110 of the aircraft 100, forward of an aft-mounted wing 101. The fuselage 110 can include a plurality of passenger doors including a forward passenger door 119. The aircraft 100 can further include dual propulsion systems 102 integrated with the wing 101, and canted tails 103 mounted at least proximate to the propulsion systems 102 to provide yaw stability and control. An aft body 104 positioned between the propulsion systems 102 and the fuselage 110 can include pitch control surfaces 105 which, together with the canard assembly 120, provide pitch stability and control authority for the aircraft 100.

Figure 2:
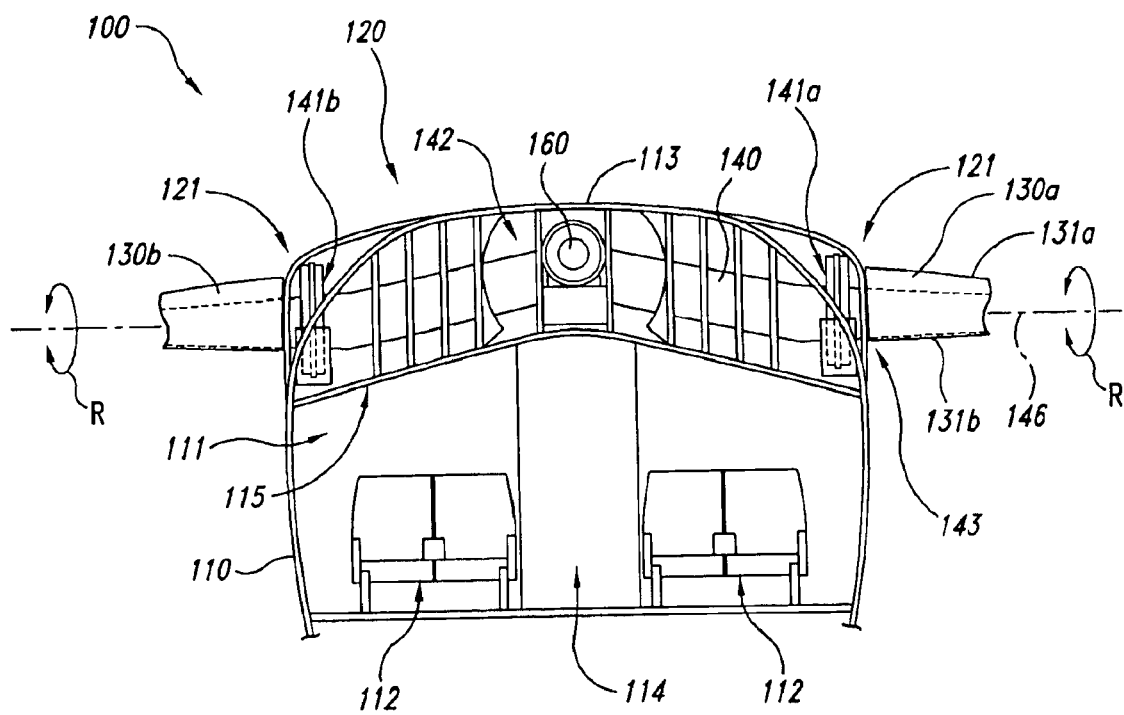
FIG. 2 is a partially schematic, cross-sectional view of a portion of the aircraft shown in FIG. 1 taken substantially along line 2—2.

FIG. 2 is a partially schematic, cross-sectional illustration of an embodiment of the aircraft 100, taken substantially along line 2—2 of FIG. 1. As shown in FIG. 2, the fuselage 110 can include a pressurized cabin 111 having passenger seating 112, one or more aisles 114, galleys, and other features typical of commercial aircraft passenger cabins. The fuselage 110 can further include an unpressurized canard housing 113 positioned above the passenger cabin 111. A ceiling 115 is positioned between the pressurized cabin 111 and the canard housing 113. As described in greater detail below, the canard housing 113 can be sized and positioned to movably support the canard assembly 120 while preserving a large volume for the pressurized cabin 111.

In one embodiment, the canard assembly 120 includes two airfoil portions 130 (shown as a left airfoil portion 130a and a right airfoil portion 130b). Each airfoil portion 130 can include a first or upper surface 131a and a second or lower surface 131b. The airfoil portions 130 can be connected with a connecting portion 140 (such as a spindle) that extends between the airfoil portions 130 through the canard housing 113. Accordingly, the airfoil portions 130 extend external to the fuselage 110, and the connecting portion 140 extends internal to the fuselage 110. An interface region 121 of the canard assembly 120 can be aligned with an external wall of the fuselage 110, between the external portions and the internal portions of the canard assembly 120.

In another aspect of this embodiment, the connecting portion 140 includes two attachment portions 141 (shown as a left attachment portion 141a and a right attachment portion 141b). The attachment portions 141 couple the connecting portion 140 to the fuselage 110 while allowing the connecting portion 140 and the airfoil portions 130 to move relative to the fuselage 110. For example, in one embodiment, the connecting portion 140 and the airfoils 130 can rotate as a unit about a rotation axis 146, as indicated by arrows R. Accordingly, the connecting portion 140 can be coupled to an actuator 160 for active rotation about the rotation axis 146. In other embodiments, the airfoil portions 130 and/or the connecting portion 140 can move relative to the fuselage 110 in other manners.

In a particular aspect of an embodiment in which the connecting portion 140 rotates relative to the fuselage 110, the rotation axis 146 can pass through the interface region 121, and through a minimum cross-sectional area 143 of the connecting portion 140. In another aspect of this embodiment, the connecting portion 140 can include an intermediate region 142 positioned between the attachment portions 141 directly along the rotation axis 146 or offset vertically away from the rotation axis 146. In a further aspect of this embodiment, the intermediate region 142 can have a cross-sectional area that is the same as or larger than that of the minimum cross-sectional area 143. As described in greater detail below with reference to FIGS. 3 and 4, the foregoing features can reduce the impact of the airfoil portions 130 and associated actuation system on the volume of the pressurized cabin 111.

Figure 3:
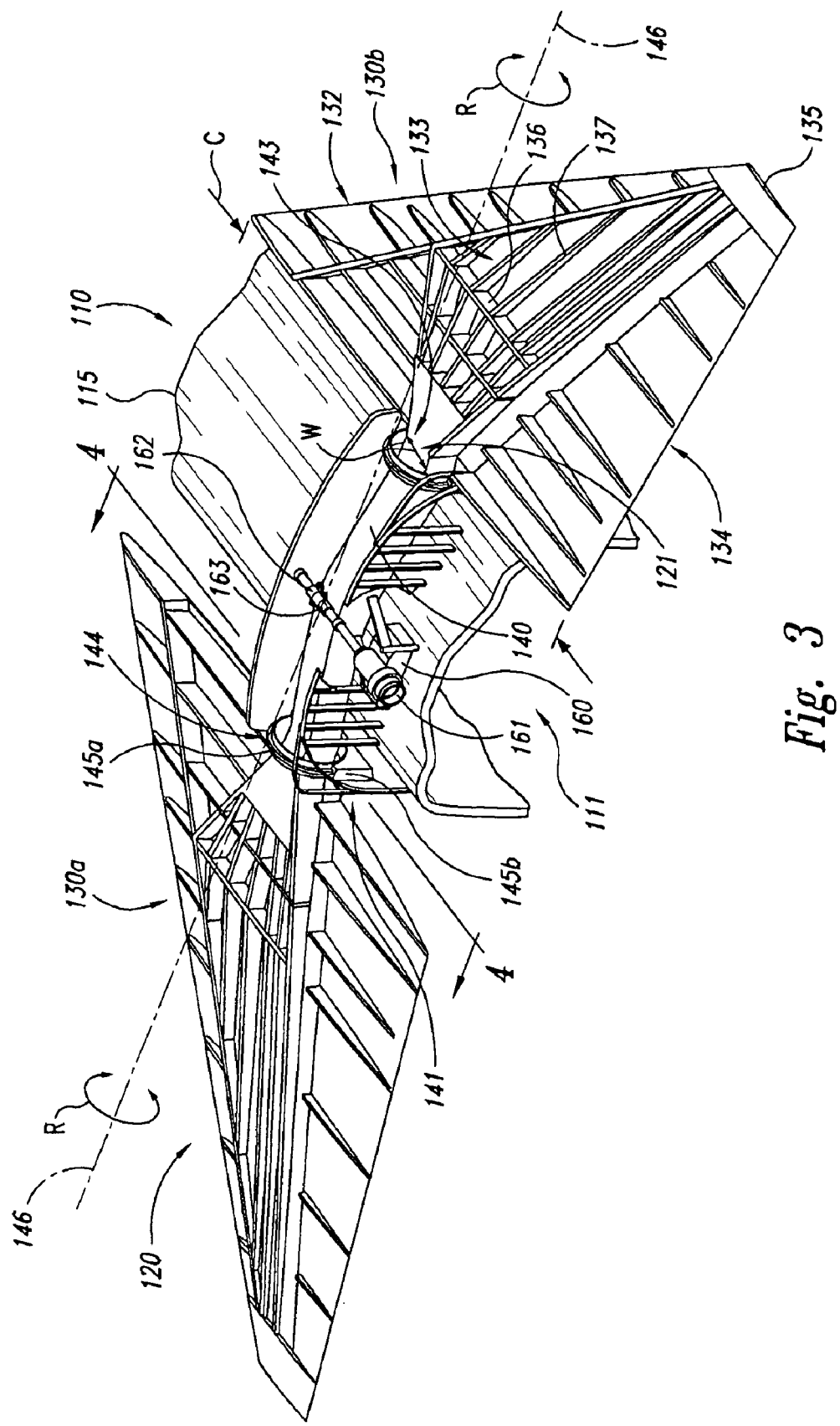
FIG. 3 is a partially schematic, top rear isometric view of a canard assembly configured in accordance with an embodiment of the invention.

FIG. 3 is a partially cutaway, top isometric view of an embodiment of the canard assembly 120 and a portion of the fuselage 110. In one aspect of this embodiment, the airfoil portions 130 of the canard assembly 120 each include a central portion 133, a leading edge 132 forward of the central portion 133, a trailing edge device 134 (e.g., an elevator) aft of the central portion 133, and an outboard tip 135. In one aspect of this embodiment, the trailing edge device 134 can be movable relative to the central portion 133, for example, to provide trim control for the airfoil portion 130. Accordingly, the trailing edge device 134 can be operatively coupled to an actuator (not shown in FIG. 3) positioned in the central portion 133, while the central portion 133 provides pitch control. As a result, the central portion 133 can be actuated at a more rapid rate than the trailing edge device 134. This is unlike some conventional aft-mounted tail arrangements where an all-moving (and slow moving) tail provides trim control and a rapidly moving trailing edge elevator provides pitch control. In other embodiments, the trailing edge can be fixed relative to the central portion 133. In still further embodiments, the leading edge 132 can be movable relative to the central portion 133.

In any of the foregoing embodiments, the components of the airfoil portions 130 can include longitudinal spars 136 and/or transverse stringers 137 arranged to provide a generally rigid structure. In a particular aspect of this embodiment, the stringers 137 of the central portion 133 can converge as they extend inboard toward the fuselage 110. In a further aspect of this embodiment, the stringers 137 can be integrally connected to the connecting portion 140 to provide a strong structural link between the connecting portion 140 and the airfoil portions 130. In other embodiments, the airfoil portions 130 can have other structural arrangements, such as a laminated core construction.

In still a further aspect of this embodiment, the connecting portion 140 can have its minimum cross-sectional area 143 positioned proximate to the interface region 121 between the portion of the canard assembly 120 external to the fuselage 110 and the portion of the canard assembly 120 internal to the fuselage 110. The minimum cross-sectional area 143 can have a width W (e.g., in a chordwise direction) that is relatively small compared to a maximum chord length C of the airfoil 130. For example, in one aspect of this embodiment, the width W can have a value that ranges from about 5% to about 15% of the maximum chord length C. In a particular embodiment, the width W can have a value of about 7% of the maximum chord length C. In any of these embodiments, the rotation axis 146 can pass through the minimum cross-sectional area 143. Accordingly, the maximum excursion of any point on the connecting portion 140 relative to its neutral position is relatively small, even when the airfoil portions 130 rotate through relatively large angular deflections.

In one embodiment, the airfoil portions 130 can rotate through a total angular deflection of about 40° relative to the neutral position. In a particular aspect of this embodiment, the total angular deflection can include about 15° of upward excursion (e.g., with the leading edge 132 deflected upwardly relative to its neutral position by 15°) and about 25° of downward deflection (e.g., with the leading edge 132 deflected downwardly from its neutral position by 25°). In other embodiments, the airfoil portions 130 can rotate through other angular ranges, and/or the angular ranges can have different upward and/or downward components. In any of these embodiments, the impact of these deflections on the available volume of the pressurized cabin 111 can be relatively small because, for example, (a) the connecting portion 140 has a relatively small cross-sectional area, relative to the maximum chord length of the airfoil portions 130 and (b) the rotation axis 146 passes through the interface region 121 and the minimum cross-sectional area 143. In still further embodiments, the airfoil portions 130 can rotate through different angular ranges, depending, for example on whether the aircraft is airborne or on the ground. Further details of such embodiments are described below with reference to FIGS. 6 and 7.

In one embodiment, the attachment portions 141 each include a bearing 144 positioned to allow rotational motion of the connecting portion 140. In one aspect of this embodiment, each bearing 144 can include an arcuate first bearing surface 145a depending from the connecting portion 140 and engaged with an arcuate second bearing surface 145b depending from the fuselage 110. The bearing 144 can include a ball bearing arrangement, a roller bearing arrangement or other bearing arrangements known to those of ordinary skill in the art. In any of these embodiments, the bearing 144 can accommodate the rotational motion of the connecting portion 140 and the airfoil portions 130 relative to the fuselage 110.

An actuator 160 imparts the rotational motion to the connecting portion 140. In one embodiment, the actuator 160 includes a rotary motor 161 coupled to a ball screw 162. The ball screw 162 can engage a corresponding ball nut 163 which is coupled to the connecting portion 140 with a gimbal mount. As the shaft of the motor 161 rotates, the ball screw 162 threadably engages the ball nut 163, driving the nut 163 forward and aft along an arcuate path, which rotates the connecting portion 140 and the airfoil portions 130 about the rotation axis 146. In a particular aspect of this embodiment, the actuator 160 can operate at relatively high rates. For example, the actuator 160 can drive the airfoil portions 130 at a rate of about 20° or more per second. In a particular example, the airfoil portions 130 can move at a rate of about 40° or more per second. The ball screw 162 can rotate at rates up to and above 900 rpm to provide the rapid rotation rate of the airfoil portions 130. In other embodiments, the actuator 160 can include other arrangements and can operate at other speeds. For example, the actuator 160 can include a linear actuator and/or a rack and pinion arrangement. Further details of aspects of the actuator 160 and associated devices are provided below with reference to FIGS. 6 and 7.

Figure 4:
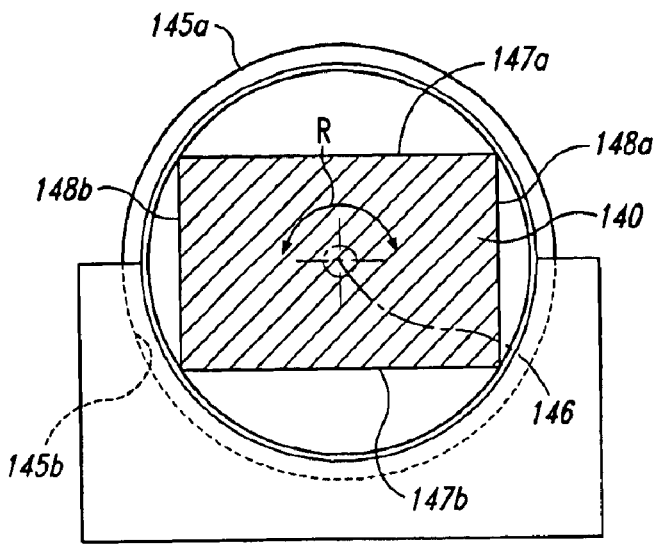
FIG. 4 is a partially schematic, cross-sectional view of a connecting portion of a canard assembly configured in accordance with an embodiment of the invention.
Figure 5:
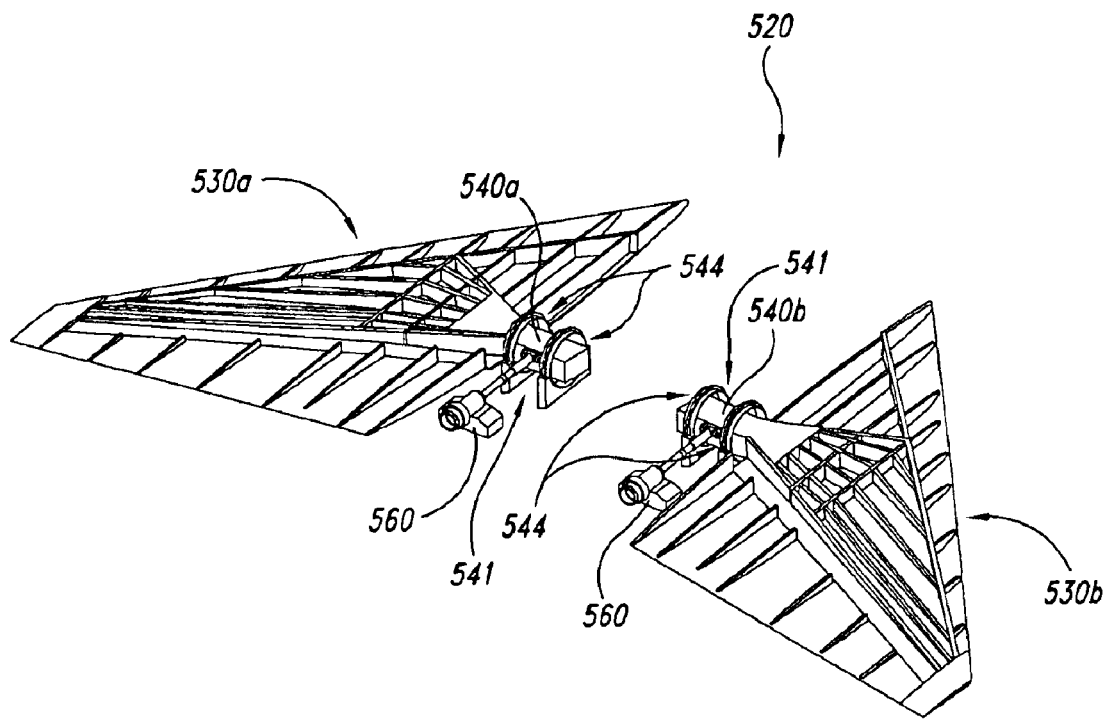
FIG. 5 is a top rear isometric view of a canard assembly having cantilevered airfoils in accordance with another embodiment of the invention.

FIG. 4 is a partially schematic illustration of part of the connecting portion 140 taken substantially along line 4—4 of FIG. 3. In one embodiment, the connecting portion 140 can have a generally rectangular cross-sectional shape, and in other embodiments, the connecting portion 140 can have other cross-sectional shapes. In any of these embodiments, the connecting portion 140 can be configured to carry bending loads from the airfoil portions 130 (FIG. 3) to the fuselage 110 (FIG. 3). For example, when the airfoil portions 130 are subjected to vertical loads, the connecting portion 140 can transmit bending loads along first and second vertical load paths 147a and 147b. When the airfoils 130 are subjected to longitudinal loads, the connecting portion 140 can transmit loads along first and second longitudinal load paths 148a, 148b. The rotation axis 146 can be positioned between any pair of load paths to provide for a compact arrangement with a relatively low rotational moment of inertia.

One feature of an embodiment of the canard assembly 120 described above with reference to FIGS. 1–4 is that the connecting portion 140 has a relatively small cross-sectional area, and a relatively small width W compared to the maximum chord length C of the airfoil portions 130 that it supports. An advantage of this feature is that the connecting portion 140 occupies a relatively small volume within the fuselage 110, while still providing adequate support to the airfoil portions 130. Accordingly, the impact of the connecting portion 140 on the volume of the pressurized cabin 111 is relatively small. This is unlike some existing canard attachment arrangements for which the structure passing into the aircraft fuselage has a width of from about 50% to about 75% of the maximum chord length of the corresponding airfoil.

Another feature of an embodiment of the canard assembly 120 described above with reference to FIGS. 1–4 is that the rotation axis 146 passes through the interface region 121, the minimum cross-sectional area 143, and/or a region between the load paths that carry loads from the airfoil portions 130 to the fuselage 110. Accordingly, points on the connecting portion 140 remain relatively close to the rotation axis 146 as the airfoil portions 130 rotate. This is unlike some existing tail attachment arrangements for which the attachment structure is pivoted at its extreme forward or aft edge and accordingly sweeps out a large volume as it rotates. An advantage of arrangements in accordance with embodiments of the present invention is that the impact of the connecting portion 140 on the volume of the pressurized cabin 111 can be substantially less than with conventional arrangements, even though the airfoil portions 130 rotate through a relatively large angular range. Another advantage of this arrangement is that the rotational moment of inertia of the connecting portion 140 is relatively small, which allows the connecting portion 140 to be rotated at relatively high speeds.

Still another feature of an embodiment of the canard assembly 120 described above with reference to FIGS. 1–4 is that the connecting portion 140 can include an intermediate region 142 that is vertically offset from the attachment portions 141. An advantage of this feature is that the canard housing 113 into which the connecting portion 140 fits can be vertically offset over the aisle 114 of the pressurized cabin 111, allowing for greater mobility of the passengers within.

Yet another feature of an embodiment of the canard assembly 120 is that it can include an all-moving, high rotation rate central portion 133 and an independently movable trailing edge device 134. The design, when coupled with a fly-by-wire control system, can allow for the rapid attainment of maximum control authority when needed, while still maintaining the ability to position the surfaces optimally for best airplane performance. This design can also reduce the size of the canard assembly 120, thus providing weight and cost benefits to the aircraft on which it is installed. Another advantage of this arrangement is that the trailing edge devices 134 on opposite sides of the fuselage 110 can be independently actuated in an asymmetric fashion to generate yaw control, which can allow for a reduction in the size of the aircraft vertical tails, providing another potential weight and cost benefit.

In other embodiments, the canard assembly can have other arrangements that also have a reduced impact on the volume of the pressurized cabin 111 of the fuselage 110. For example, in one embodiment shown in FIG. 5, a canard assembly 520 can include airfoil portions 530a and 530b, each of which has a separate connecting portion 540 (shown as a first connecting portion 540a and a second connecting portion 540b). Each connecting portion 540 extends into the fuselage 110 (FIG. 2) and includes a corresponding attachment portion 541. The attachment portions 541 can each include two bearings 544 that support the airfoil portions 530 in a dual cantilevered arrangement. Each connecting portion 540 can also be coupled to an actuator 560 to drive the airfoil portions 530 through a range of angles at a range of angular velocities generally similar to those described above with reference to FIGS. 1–4. The structure required to support and operate the actuators 560 can be positioned in opposing vertically aligned, closet-type structures in the fuselage 110. Accordingly, an advantage of this arrangement is that it can have a reduced impact on the head room within the pressurized cabin 111. Conversely, an advantage of the arrangement described above with reference to FIGS. 1–4 is that it does not have a substantial impact on the lateral volume of the pressurized cabin 111. A further advantage of the arrangement described above with reference to FIGS. 1–4 is that the connecting portion 140 extends entirely through the fuselage 110 and is attached to both airfoil portions 130, which is generally structurally more efficient than the cantilevered arrangement shown in FIG. 5.

Figure 6:
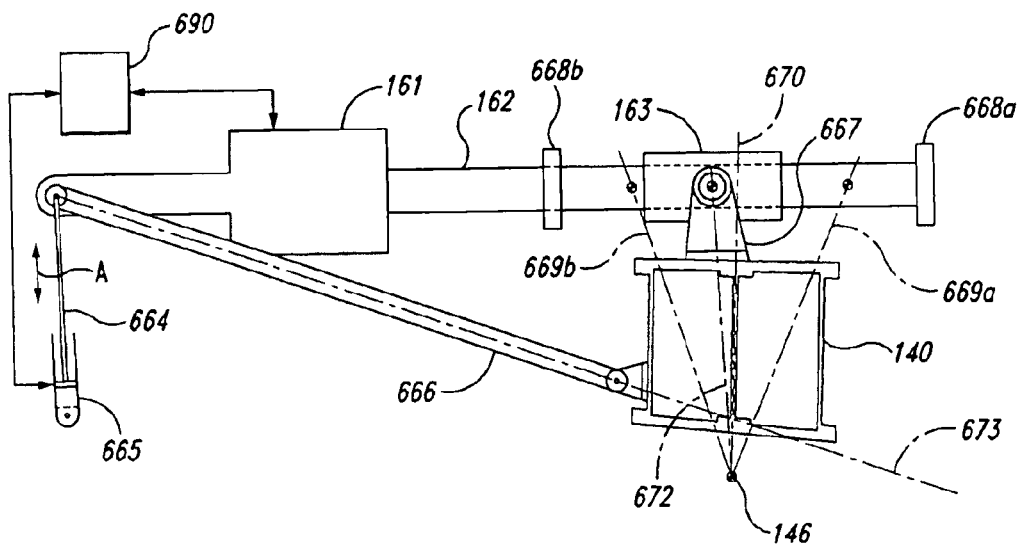
FIG. 6 is a partially schematic, side elevation view of a canard assembly having an actuator arrangement in a neutral position in accordance with an embodiment of the invention.
Figure 7:
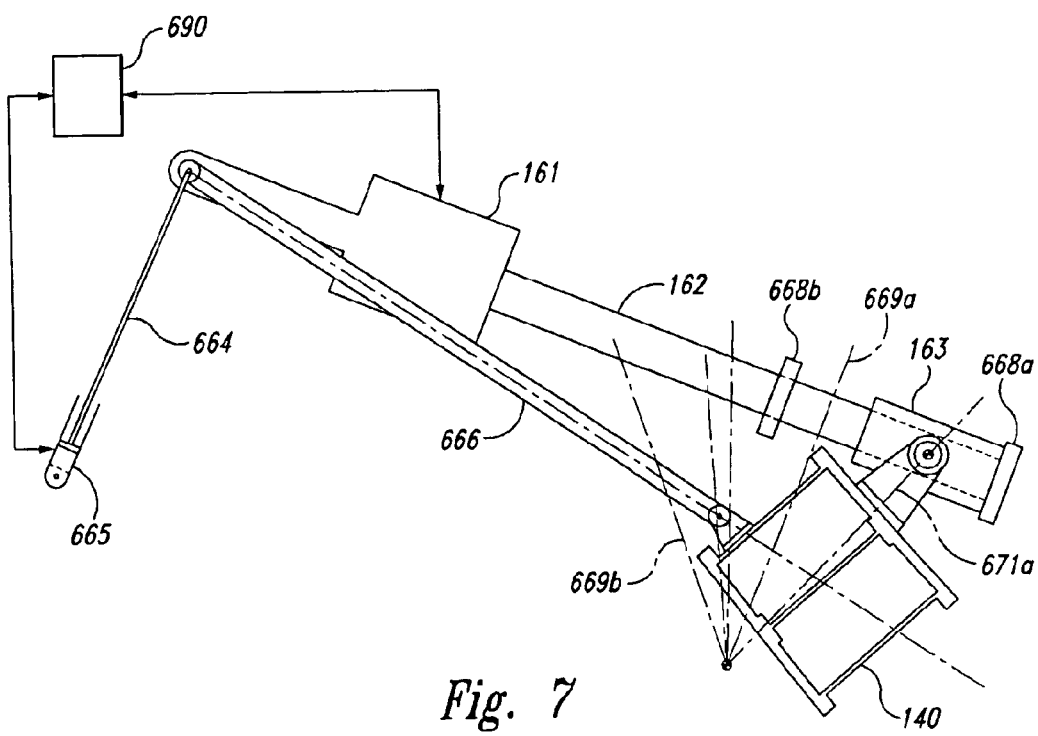
FIG. 7 is a partially schematic, side elevation view of an embodiment of the canard assembly shown in FIG. 6, deployed in the second of two actuation ranges.

FIGS. 6 and 7 illustrate details of an actuator arrangement, suitable for activating canard assemblies, such as those described above with reference to FIGS. 1–5, in accordance with embodiments of the invention. In one embodiment, the actuator arrangement can include the actuator motor 161, ball screw 162, and ball nut 163, described above with reference to FIG. 3. The ball nut 163 can be pivotally mounted to the connecting portion 140 with a mounting bracket 667. The arrangement can further include a reaction link 666 pivotally coupled between the actuator motor 161 and the connecting portion 140 to react at least part of the loads transmitted through the ball screw 162 to the actuator motor 161.

The connecting portion 140 can have a neutral position 670 from which it is rotated. The actuator motor 161 can drive the connecting portion 140 forward to a first downward limit 669a and aft to a first upward limit 669b. As described above, the first downward limit 669a can be deflected 25° from the neutral position 670, and the first upward limit 669b can be deflected 15° from the neutral position 670. In other embodiments, the limits 669a, 669b can have other values. In any of these embodiments, stop members 668 (shown as a forward stop member 668a and an aft stop member 668b) can limit the travel of the ball nut 163 along the ball screw 162 at positions that correspond with the limits 669a, 669b, respectively.

In one aspect of an embodiment shown in FIG. 6, the actuator motor 161 can act on a moment arm 672 that passes through the rotation axis 146. The reaction link 666 can react forces along a reaction link line of action 673. In one aspect of this embodiment, the reaction link line of action 673 does not pass through the rotation axis 146. In another aspect of this embodiment, the reaction link 666 can be attached to the connecting portion 140 at a point that is offset from the moment arm 672. In other embodiments, the reaction link 666 can have other arrangements.

The actuator arrangement can further include a hanger link 664 pivotally attached to the actuator motor 161. In most conventional arrangements, the hanger link 664 has a fixed length and is pivotally attached to a supporting structure, such as the fuselage 110 (FIG. 3). In one aspect of an embodiment shown in FIG. 6, the hanger link 664 can be coupled to an over-travel actuator 665 and can extend axially as indicated by arrow A to provide a second range of motion for the connecting portion 140, as described in greater detail below with reference to FIG. 7.

FIG. 7 is a partially schematic illustration of the arrangement described above with reference to FIG. 6, with the hanger link 664 extended to its deployed position. In its deployed position, the over-travel actuator 665 and the hanger link 664 together can drive the connecting portion 140 beyond its first downward limit 669a to a second downward limit 671a. In one aspect of this embodiment, the second downward limit 671a can be located an additional 20° beyond the first downward limit 669a. In other embodiments, the second downward limit 671a can have other positions relative to the first downward limit 669a. In any of these embodiments, the actuator motor 161 can move the connecting portion 140 over a first range of motion (e.g., from 15° upward deflection to 25° downward deflection), and the over-travel actuator 665 can move the connecting portion 140 over a second range of motion (e.g., from 25° downward deflection to 45° downward deflection). A control device, such as a lock-out device 690, can control when each range of motion is available.

In one embodiment, the first and second ranges of motion described above can be available during different operating regimes of the canard assembly 120 (FIG. 3). For example, in one embodiment, the connecting portion 140 can be operated over the first range (e.g., between the first upward limit 669b and the first downward limit 669a) while the aircraft is in flight. The over-travel actuator 665 can operate the connecting portion 140 over the second range (e.g., down to the second downward limit 671a) only while the aircraft is on the ground. An advantage of this arrangement is that the canard assembly 120 can be deflected downwardly to allow improved access to the forward passenger door 119 (FIG. 1). Accordingly, conventional jetways and/or mobile steps can be easily positioned proximate to the forward passenger door 119 without risking contact with and/or damage to the canard assembly 120.

In another aspect of this embodiment, the lock-out device 690 can prevent the over-travel actuator 665 from actuating (e.g., moving the hanger link 664 to its extended position) unless the aircraft is in a suitable operating regime. For example, in one embodiment, the over-travel actuator 665 can be actuated only when the aircraft is on the ground. In another embodiment, the over-travel actuator 665 can be actuated only when the forward passenger door 119 is open or unlocked. In still a further embodiment, the over-travel actuator 665 can move the hanger link 164 to its extended position only when the over-travel actuator 665 is unpowered, such as when the aircraft engines are shut down. In yet another embodiment, the over-travel actuator 665 can be coupled to software that prevents its actuation outside a selected range of aircraft operating conditions. In still a further embodiment, the over-travel actuator 665 can be sized so that it is unable to overcome aerodynamic loads on the canard assembly 120 during flight, and can accordingly only move the connecting portion 140 beyond the first downward limit 669a when the aircraft is not in flight. In other embodiments, the lock-out device can include other arrangements, such as those currently in use for aircraft passenger doors, cargo doors, and/or high lift systems. In any of these embodiments, an advantage of the lock-out device is that it can prevent the canard assembly from deploying to positions in flight that could potentially cause the aircraft to enter an uncontrollable attitude.

In one aspect of an embodiment described above, the second range of motion for the canard assembly 120 can be used to allow improved access to the forward passenger door 119. In other embodiments, the second range of motion for the canard assembly 120 can be used for other purposes. For example, in one embodiment, the canard assembly 120 can be deployed to the second downward limit 671a to allow for improved access during maintenance operations.

In other embodiments, actuator arrangements which include multiple actuators coupled to the same actuated device to move the actuated device over different motion ranges, can be implemented on other aircraft devices. For example, such an arrangement can be implemented on an aircraft high-lift system (such as an aircraft leading and/or trailing edge system). In still further embodiments, such an arrangement can be implemented on non-aircraft moveable devices.

From the foregoing, it will be appreciated that, although specific embodiments of the invention have been described herein for purposes of illustration, various modifications may be made without deviating from the spirit and scope of the invention. For example, embodiments of the canard arrangement can be implemented on aircraft having configurations different than that shown in FIG. 1. Other arrangements of structures having characteristics in common with those disclosed herein are included in the following pending U.S. Applications, both of which are filed concurrently herewith and both of which are incorporated herein by reference: Ser. No. 10/689,972 entitled "Method and Apparatus for Installing and Actuating Movable Airtails, Including Canards," and Ser. No. 10/690,285 entitled "Method and Apparatus for Rotatably Supporting Movable Components, Including Canards," Accordingly, the invention is not limited except as by the appended claims.

What is claimed is:

1. An aircraft, comprising:

a fuselage portion;

a wing portion coupled to the fuselage portion;

a movable device having a first range of motion and a second range of motion different than the first range of motion;

a first actuator coupled to the movable device, the first actuator being positioned to move the movable device over the first range of motion;

a second actuator coupled to the movable device, the second actuator being positioned to move the movable device over the second range of motion; and a control device coupled to the second actuator and configured to prevent actuation of the second actuator when the aircraft is airborne.

2. The aircraft of claim 1 wherein the second actuator is operatively coupled to both the first actuator and the movable device, and wherein actuation of the second actuator produces movement of both the first actuator and the movable device.

3. The aircraft of claim 1 wherein the second actuator is operatively coupled to both the first actuator and the movable device, and wherein actuation of the second actuator produces movement of the first actuator and the movable device as a unit.

4. The aircraft of claim 1 wherein the movable device includes a canard.

5. The aircraft of claim 1 wherein the first actuator has a first load capacity and wherein the second actuator has a second load capacity less than the first load capacity.

6. An aircraft, comprising:

a fuselage portion;

a wing portion coupled to the fuselage portion;

a movable device having a first range of motion and a second range of motion different than the first range of motion, wherein at least a portion of the second range of motion extends beyond the first range of motion;

a first actuator coupled to the movable device, the first actuator being positioned to move the movable device over the first range of motion and having a first load capacity;

a second actuator coupled to the movable device, the second actuator being positioned to move the movable device over the second range of motion, the second actuator being operatively coupled to both the first actuator and the movable device so that actuation of the second actuator produces movement of both the first actuator and the movable device, the second actuator having a second load capacity less than the first load capacity; and a control device coupled to at least one of the first and second actuators, the control device being configured to control actuation of the at least one of the first and second actuators.

7. The aircraft of claim 6 wherein the control device is configured to prevent actuation of at least one of the first and second actuators when a threshold condition is met.

8. The aircraft of claim 6 wherein the first actuator is positioned to move the movable device over a first angular range of motion and the second actuator is positioned to move the movable device over a second angular range of motion with at least a portion of the second angular range of motion extending beyond the first angular range of motion.

9. The aircraft of claim 6 wherein the first actuator includes a leadscrew device and wherein the second actuator includes a linearly extendible link.

10. An aircraft, comprising:

a fuselage portion;

a wing portion coupled to the fuselage portion;

a canard movably coupled to the fuselage portion, the canard having a first range of motion and a second range of motion, with at least a portion of the second range of motion different than the first range of motion;

a first actuator coupled to the canard to move the canard over the first range of motion, the first actuator having a first load capacity; and a second actuator coupled to the canard and the first actuator to move the canard and the first actuator over the second range of motion, the second actuator having a second load capacity less than the first load capacity.

11. The aircraft of claim 10, further comprising a control device coupled to the first and second actuators, the control device being configured to selectively prevent actuation of the second actuator.

12. The aircraft of claim 10 wherein the second actuator is sized to move the canard while the aircraft is stopped, further wherein the canard is subjected to an aerodynamic load during a portion of an operating envelope of the aircraft, and further wherein the second actuator has a maximum force capability that is less than the aerodynamic load.

13. The aircraft of claim 10 wherein the fuselage includes an access door between an interior region of the fuselage and an exterior region of the fuselage, and wherein the first range of motion of the canard has a first limit and the second range of motion of the canard has a second limit different than the first limit, further wherein the canard allows greater access to the access door when at the second limit than when at the first limit.

14. The aircraft of claim 10 wherein the first range of motion includes an angular range of from 15 degrees on a first side of a neutral position to about 25 degrees on a second side of the neutral position, and wherein the second range of motion includes an angular range extending to about 40 degrees on the second side of the neutral position.

15. An apparatus, comprising:

a movable device having a first range of motion and a second range of motion different than the first range of motion;

a first actuator coupled to the movable device to move the movable device over the first range of motion, the first actuator having a first load capacity;

a second actuator coupled to the movable device to move the movable device over the second range of motion, the second actuator being operatively coupled to both the first actuator and the movable device so that actuation of the second actuator produces movement of both the first actuator and the movable device, the second actuator having a second load capacity less than the first load capacity; and a control device coupled to at least one of the first and second actuators, the control device being configured to control actuation of the at least one of the first and second actuators.

16. The apparatus of claim 15 wherein the control device is configured to prevent actuation of at least one of the first and second actuators when a threshold condition is met.

17. The apparatus of claim 15 wherein actuation of the second actuator produces movement of the first actuator and the movable device as a unit.

18. The apparatus of claim 15 wherein the movable device includes an aircraft canard.

19. The apparatus of claim 15 wherein the first actuator is positioned to move the movable device over a first angular range of motion and the second actuator is positioned to move the movable device over a second angular range of angular motion, with at least a portion of the second angular range of motion extending beyond the first angular range of motion.

20. The apparatus of claim 15 wherein the first actuator includes a leadscrew device and wherein the second actuator includes a linearly extendible link.

21. An aircraft, comprising:

a fuselage portion;

a wing portion coupled to the fuselage portion;

a movable device having a first range of motion and a second range of motion different than the first range of motion;

first actuation means coupled to the movable device to move the movable device over the first range of motion;

second actuation means coupled to the movable device to move the movable device over the second range of motion; and control means coupled to the first and second actuation means, the control means being configured to control actuation of at least one of the first and second actuation means and prevent actuation of at least one of the first and second actuation means when a threshold condition is met.

22. The aircraft of claim 21 wherein the control means is configured to prevent actuation of the second actuation means when the aircraft is airborne.

23. The aircraft of claim 21 wherein the second actuation means is operatively coupled to both the first actuation means and the movable device, and wherein actuation of the second actuation means produces movement of both the first actuation means and the movable device.

24. The aircraft of claim 21 wherein the movable device includes a canard.

25. The aircraft of claim 21 wherein the first actuation means has a first load capacity and wherein the second actuation means has a second load capacity less than the first load capacity.

26. A method for manufacturing an aircraft, comprising:

coupling a movable device to a portion of an aircraft, the movable device having a first range of motion and a second range of motion different than the first range of motion;

coupling a first actuator to the movable device, the first actuator being positioned to move the movable device over the first range of motion;

coupling a second actuator to the movable device, the second actuator being positioned to move the movable device over the second range of motion; and connecting a control device to the first and second actuators, the control device being configured to control actuation of at least one of the first and second actuators and prevent actuation of at least one of the first and second actuators when the aircraft is airborne.

27. The method of claim 26 wherein coupling the second actuator includes coupling the second actuator to move both the first actuator and the movable device.

28. A method for manufacturing an aircraft, comprising:

coupling a movable device to a portion of an aircraft, the movable device having a first range of motion and a second range of motion different than the first range of motion;

coupling a first actuator to the movable device, the first actuator being positioned to move the movable device over the first range of motion and having a first load capacity;

coupling a second actuator to the movable device to move both the second device and the first actuator, the second actuator being positioned to move the movable device over the second range of motion, the second actuator having a second load capacity less than the first load capacity; and connecting a control device to the first and second actuators, the control device being configured to control actuation of at least one of the first and second actuators.

29. The method of claim 28 wherein coupling the movable device includes coupling a canard to a fuselage of the aircraft.

30. The method of claim 28 wherein connecting a control device includes connecting a control device configured to prevent actuation of at least one of the first and second actuators when a threshold condition is met.

* * * * *